(12) United States Patent
Sato et al.

(10) Patent No.: US 8,721,442 B2
(45) Date of Patent: May 13, 2014

(54) RECORDING MEDIUM RECORDING GAME PROGRAM AND GAME APPARATUS

(75) Inventors: Kenta Sato, Kyoto (JP); Yoshikazu Yamashita, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2271 days.

(21) Appl. No.: 11/581,007

(22) Filed: Oct. 16, 2006

(65) Prior Publication Data

US 2007/0293317 A1 Dec. 20, 2007

(30) Foreign Application Priority Data

Jun. 20, 2006 (JP) ................................. 2006-169972

(51) Int. Cl.
*A63F 9/24* (2006.01)
(52) U.S. Cl.
USPC .......................................................... 463/36
(58) Field of Classification Search
USPC .......................................... 463/1, 36, 37, 38
See application file for complete search history.

(56) References Cited

U.S. PATENT DOCUMENTS

| | | | |
|---|---|---|---|
| 5,734,373 A | 3/1998 | Rosenberg et al. | |
| 2001/0008849 A1 | 7/2001 | Komata | |
| 2004/0070564 A1* | 4/2004 | Dawson et al. | 345/156 |
| 2004/0204240 A1* | 10/2004 | Barney | 463/36 |
| 2006/0264259 A1* | 11/2006 | Zalewski et al. | 463/36 |

FOREIGN PATENT DOCUMENTS

JP 2002-7057 1/2002

OTHER PUBLICATIONS

Baker, "A Joystick Library", http://web.archive.org/web/20060429130535/http://plib.sourceforge/net/js/index.html, Apr. 29, 2006, 4 pages.

* cited by examiner

*Primary Examiner* — David L Lewis
*Assistant Examiner* — Eric M Thomas
(74) *Attorney, Agent, or Firm* — Nixon & Vanderhye P.C.

(57) ABSTRACT

Of possible values of input data varying, depending on a motion of an input device itself, a predetermined value is set as a first reference value. Also, of possible values of a game parameter converted from the input data, a predetermined value is set as a second reference value. Further, of an input value range, a predetermined range including the first reference value is set as a conversion range. When a value of input data is included in the conversion range, the input data is converted into a game parameter by a first conversion expression which provides a value closer to the second reference value when the input data is directly converted. Based on the game parameter, a game process is performed.

21 Claims, 14 Drawing Sheets

RECORDING MEDIUM RECORDING GAME PROGRAM AND GAME APPARATUS

CROSS REFERENCE TO RELATED APPLICATION

The disclosure of Japanese Patent Application No. 2006-169972, filed Jun. 20, 2006, is incorporated herein by reference.

BACKGROUND

1. Field of the Technology

The technology presented herein relates to a recording medium recording a game program and a game apparatus. More particularly, the present technology relates to a recording medium recording a game program for performing a game process, depending on a motion of an input device itself, and a game apparatus.

2. Description of the Background Art

Conventionally, there are games in which sports equipment, such as a table tennis racket, a baseball bat, or the like, is swung (e.g., a table tennis game, a baseball game, etc.). In these games, a button or a lever which utilizes a switch is used as a controller for inputting a motion of swinging the sports equipment. Also, apart from this, a controller (input device) in the shape of sports equipment has been disclosed (e.g., Japanese Patent Laid-Open Publication No. 2002-7057). The controller disclosed in Japanese Patent Laid-Open Publication No. 2002-7057 is a table tennis racket-shaped input device. The racket-shaped input device includes a piezoelectric buzzer element, and obtains acceleration data from an electrical signal which is generated in the piezoelectric buzzer element when the racket-shaped input device is displaced. The racket-shaped input device also controls movement of a ball in a table tennis game based on the acceleration data. Therefore, by performing motions of swinging the racket-shaped input device, it is possible to provide game events which match motions of swinging an actual racket.

However, there is a problem with the above-described apparatus disclosed in Japanese Patent Laid-Open Publication No. 2002-7057 as follows. Certainly, by performing motions of swinging the racket-shaped input device, it is possible to provide game events which match motions of swinging an actual racket. However, for example, since there is peculiarity of player's ways to hold and swing the racket-shaped input device, values obtained by measurement may differ from each other even when a player thinks that he or she performs the same motion. As a result, although the player thinks that he or she performs the same motion, the motion may be processed as a different motion in the game. Therefore, in a game in which input is performed by swinging an input device itself, it is difficult to accurately input a value which a player desires to input (i.e., an input value targeted by the player), as compared to an input method which employs a joystick or the like for which a movable range is previously defined. Therefore, an input which a player desires may not be reflected on a game, so that the game may be made less interesting.

SUMMARY

Therefore, a feature of an example embodiment presented herein is to provide a recording medium recording a game program in which, when input is performed by moving an input device itself, an input value targeted by a player can be reflected on a process in a game, and a game apparatus.

The example embodiment presented herein has the following features to attain the above. Note that reference numerals, additional descriptions and the like inside parentheses in this section indicate correspondence to embodiments described below for the sake of easy understanding, and do not limit the example embodiment.

A first aspect of the example embodiment is directed to a recording medium recording a game program which causes a computer in a game apparatus to execute a game process based on an input value varying, depending on a motion of an input device itself. The program causes the computer to execute a reference value setting step (S2), a specific range setting step (S4), an input value obtaining step (S5, S6), a conversion step (S7 to S8), and a process step (S10). The reference value setting step sets a predetermined value within an input value range within which the input value can fall, as a reference value. The specific range setting step sets a portion of the input value range including the reference value, as a specific range. The input value obtaining step obtains the input value varying, depending on the motion of the input device itself. The conversion step, when the input value obtained by the input value obtaining step falls within the specific range, converting the input value into a game parameter value which is the same as or close to the reference value. The process step performs the game process using the game parameter value.

In a second aspect, in the conversion step, when the input value obtained in the input value obtaining step does not fall within the specific range, the input value is converted into a game parameter value which is the same as or in a vicinity of the input value.

In the third aspect, in the conversion step, when the input value obtained in the input value obtaining step is present at a boundary of the specific range, the game parameter value includes continuous values inside and outside of the specific range.

In a fourth aspect, in the specific range setting step, a predetermined range around the reference value as a center is set as the specific range.

In a fifth aspect, in the conversion step, the conversion is performed so as to obtain a continuous relationship between each input value within the input range and the corresponding game parameter value obtained by converting the input value.

In a sixth aspect, in the conversion step, the conversion is performed so as to obtain a continuous relationship between each input value outside the input range and the corresponding game parameter value obtained by converting the input value.

In a seventh aspect, the conversion performed in the conversion step with respect to each input value outside the input range is performed by interpolating the input values using predetermined curve interpolation.

In an eighth aspect, the reference value is a predetermined value so that a predetermined game process based on the game parameter value obtained by converting the input value provides a best result, depending on contents of a game.

In a ninth aspect, the reference value setting step includes a comparative value setting step (S23, S26), an input intermediate value calculating step (S29), a simulation step (S27, S28), and a comparative value updating step (S31, S32). The comparative value setting step sets an upper limit value of the input value range as a first comparative value and a lower limit value of the input value range as a second comparative value. The input intermediate value calculating step calculates an input intermediate value which is an intermediate value between the first comparative value and the second comparative value. The simulation step performs a predetermined game process using game parameter values obtained by performing the predetermined conversion with respect to the first comparative value and the second comparative value, to calculate respective resultant values. The comparative value updating step compares the resultant values calculated by the simulation step, and updates, with the input intermediate value, one of the first comparative value and the second comparative value which is converted by the predetermined conversion into a game parameter value which has a larger difference from the predetermined value which provides a best result, depending on the contents of the game. The input intermediate value calculating step, the simulation step, and the comparative value updating step are repeatedly performed until a predetermined condition is satisfied. In the reference value setting step, the input intermediate value when the predetermined condition is satisfied is set as the reference value.

In a tenth aspect, the predetermined condition is either that the first comparative value is equal to the second comparative value, or that an input value is obtained by the input value obtaining step.

In an eleventh aspect, the reference value setting step includes a simulation step of performing a predetermined game process with respect to game parameter values obtained by performing the predetermined conversion with respect to values within the input value range at predetermined intervals, to calculate resultant values. A value within the input value range which is converted by the predetermined conversion into a game parameter value for which one which provides a best result, depending on the contents of the game, of the resultant values calculated by the simulation step, is calculated, is set as the reference value.

In a twelfth aspect, the predetermined game process is a process of driving a movable object in a virtual game space.

In a thirteenth aspect, the predetermined value which provides the best result, depending on the contents of the game, is a value for indicating a position to which the movable object is driven or a trajectory in which the movable object is driven.

A fourteenth aspect is directed to a game apparatus (3) for performing a game process based on an input value varying, depending on a motion of an input device itself, comprising a reference value setting section (30), a specific range setting section (30), an input value obtaining section (30), a conversion section (30), and a process section (30). The reference value setting section sets a predetermined value within an input value range within which the input value can fall, as a reference value. The specific range setting section sets a portion of the input value range including the reference value, as a specific range. The input value obtaining section obtains the input value varying, depending on the motion of the input device itself. The conversion section, when the input value obtained by the input value obtaining section falls within the specific range, converts the input value into a game parameter value which is the same as or close to the reference value. The process section performs the game process using the game parameter value.

According to the first aspect, when an input operation is performed using, for example, a device which is difficult to enter an input targeted by a player (adjustment of a swing strength of the controller 7, etc.), the input targeted by the player can be reflected on a game irrespective of an actual input value. As a result, it is possible to prevent the player from being stressed since a desired input cannot be achieved, thereby making it possible to provide a comfortable game play.

According to the second aspect, an input value outside the conversion range is corrected and used as a game parameter. Therefore, the difficulty in an input operation can be reduced as a whole, thereby making it possible to allow a player to enjoy a game.

According to the third aspect, game parameter values inside and outside the specific range can be continuous at a boundary of the conversion range. Therefore, regarding a game process which is performed, depending on input values before and after the boundary of the conversion range, it is possible to prevent a player from feeling a sense of discomfort since the contents of the process significantly changes due to discontinuous values.

According to the fourth aspect, since the conversion range is provided around a reference point as a center, a balance between a player's input motion and a conversion result (game parameter) is good, thereby making it possible to provide a sense of operation to a player without a sense of discomfort.

According to the fifth aspect, the game parameter value is continuous within the conversion range. Therefore, the game difficulty is reduced, so that it is possible to provide a sense of operation to a player without a sense of discomfort, regarding a relationship between the input operation and the result of reflectance of the operation on a game.

According to the sixth aspect, the game parameter value is also continuous outside the conversion range. Therefore, it is possible to provide a sense of operation to a player without a sense of discomfort, regarding a relationship between the input operation and the result of reflectance of the operation on a game.

According to the seventh aspect, outside the conversion range, values obtained by correcting input values using curve interpolation are used as game parameters. Therefore, the difficulty in an input operation can be reduced as a whole, thereby making it possible to allow a player to enjoy the game.

According to the eighth aspect, a value which leads to a best result, depending on the contents of a game, is used as a reference value (e.g., a best shot in a golf game). Therefore, the difficulty of a game can be reduced and the briskness of the game can be increased, thereby making it possible to make the game more exciting.

According to the ninth and tenth aspects, regarding a process of calculating a game parameter which leads to a best result, depending on the contents of a game (e.g., a best shot in a golf game), the computation amount (i.e., process load) can be reduced.

According to the eleventh aspect, it is possible to accurately calculate a game parameter which leads to a best result, depending on the contents of a game.

According to the twelfth and thirteenth aspects, it is possible to reduce the difficulty of a game in which a player enjoying driving a ball, such as a golf game, a tennis game, or the like, so that the player can comfortably enjoy the game.

According to the game apparatus of the example embodiment presented herein, an effect similar to that of the recording medium recording the game program of the example embodiment can be obtained.

These and other objects aspects and advantages of the example embodiment presented herein will become more apparent from the following detailed description of the example embodiment when taken in conjunction with the accompanying drawings.

DESCRIPTION OF THE PREFERRED EMBODIMENTS

Hereinafter, example embodiments will be described with reference to the accompanying drawings. Note that the example embodiment is not limited by the examples.

Figure 1:
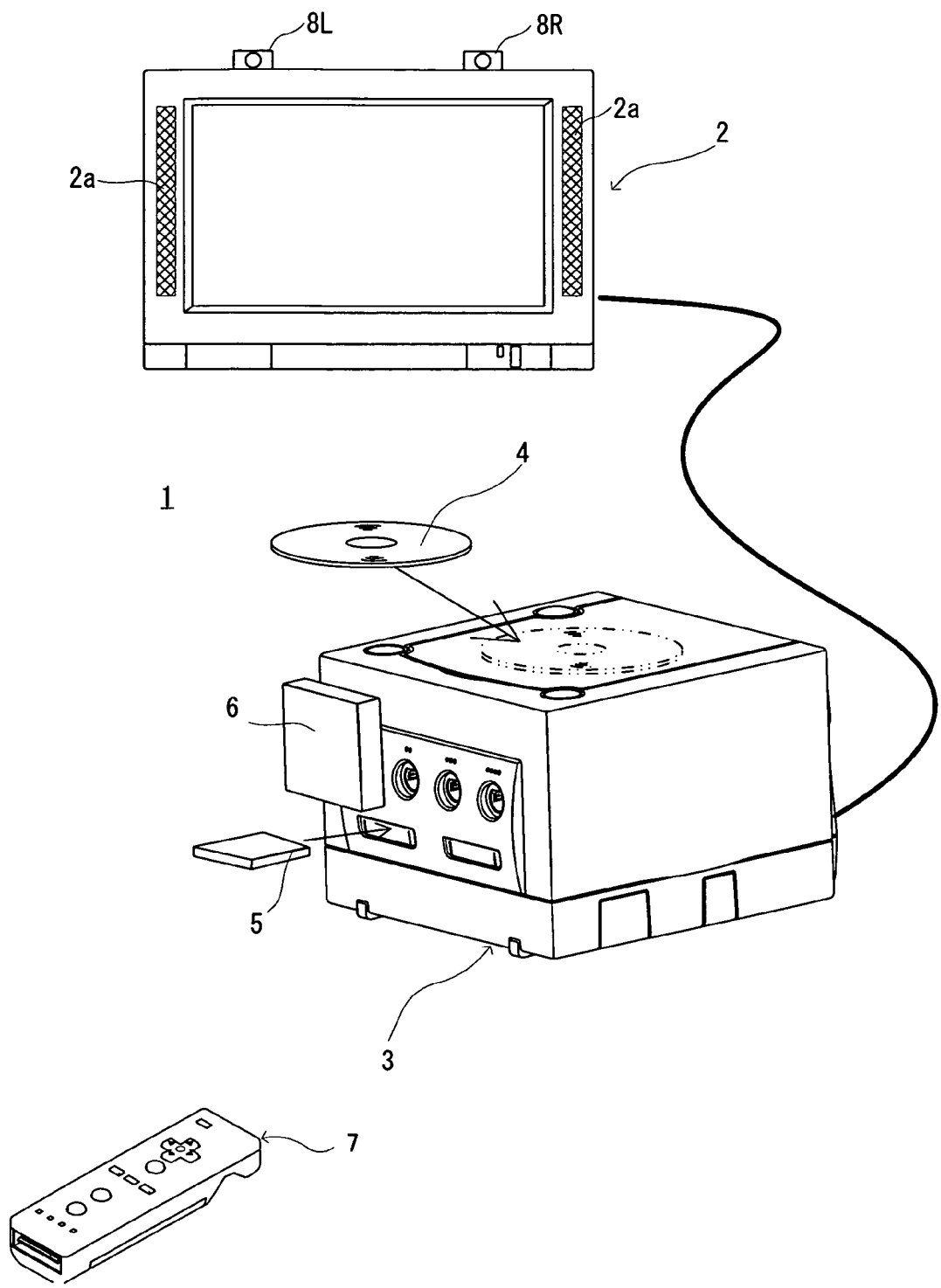
FIG. 1 is a diagram illustrating an external appearance of a game system 1 according to an embodiment.

A game apparatus according to an embodiment will be described with reference to FIG. 1. A game system 1 employing the game apparatus will be described as an example so as to specifically describe the example embodiment. Note that FIG. 1 is an external appearance diagram for describing the game system 1. Hereinafter, the game system 1 will be described, illustrating a stationary game apparatus as an example.

In FIG. 1, the game system 1 is composed of a stationary game apparatus (hereinafter simply referred to as a game apparatus) 3 which is connected via a connection code to a display (hereinafter referred to as a monitor) 2 with a loudspeaker 2a, such as a television set for home use or the like, and a controller 7 which inputs operation information to the game apparatus 3. The game apparatus 3 is connected via a connection terminal to a reception unit 6. The reception unit 6 receives transmission data wirelessly transmitted from the controller 7, so that the controller 7 and the game apparatus 3 are connected together via wireless communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using the saved data stored in the external memory card 5, and display a resultant game image on the monitor 2. The player of the game apparatus 3 can enjoy events of the game by operating the controller 7 while watching a game image displayed on the monitor 2.

The controller 7 wirelessly transmits transmission data from a communication section 75 (described below) included therein to the game apparatus 3 to which the reception unit 6 is connected, using, for example, the Bluetooth® technique. The controller 7 is an operation means for mainly performing an operation for operating a player object appearing in a game space displayed on the monitor 2. The controller 7 is provided with an operation section composed of a plurality of operation buttons, keys and sticks, and the like. The controller 7 also comprises an image capture information computing section 74 for capturing an image viewed from the controller 7 as specifically described below. As exemplary objects whose images to be captured by the image capture information computing section 74, two LED modules (hereinafter referred to as markers) 8L and 8R are provided in the vicinity of a display screen of the monitor 2. The markers 8L and 8R are used to indicate a position of the controller 7. The markers 8L and 8R each emit infrared light toward the front of the monitor 2.

Next, a configuration of the game apparatus 3 will be described with reference to FIG. 2. Note that FIG. 2 is a functional block diagram of the game apparatus 3.

Figure 2:
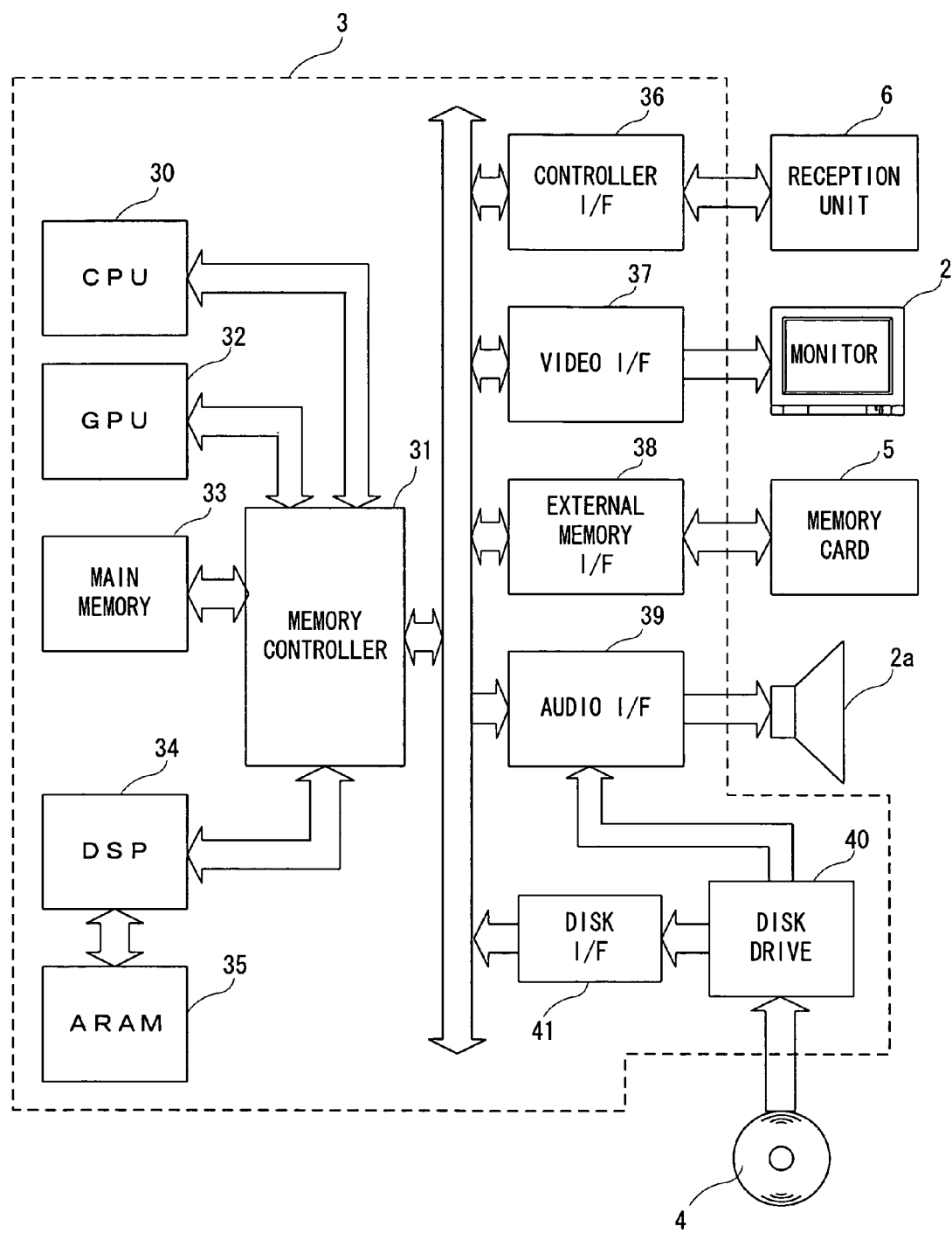
FIG. 2 is a functional block diagram of a game apparatus 3 of FIG. 1.

In FIG. 2, the game apparatus 3 comprises, for example, a RISC CPU (central processing unit) 30 which executes various programs. The CPU 30 executes a boot program stored in a boot ROM (not shown) and performs, for example, initialization of memories, such as a main memory 33 and the like, before executing a game program stored in the optical disc 4, and performing, for example, a game process corresponding to the game program. A GPU (Graphics Processing Unit) 32, the main memory 33, a DSP (Digital Signal Processor) 34, and an ARAM (Audio RAM) 35 are connected via a memory controller 31 to the CPU 30. A controller I/F (interface) 36, a video I/F 37, an external memory I/F 38, an audio I/F 39, and a disc I/F 31 are connected via a predetermined bus to the memory controller 31. The reception unit 6, the monitor 2, the external memory card 5, a loudspeaker 2a, and a disc drive 40 are connected to the controller I/F 36, the video I/F 37, the external memory I/F 38, the audio I/F 39, and the disc I/F 41, respectively.

The GPU 32 performs image processing based on an instruction from the CPU 30, and is composed of, for example, a semiconductor chip which performs a calculation process required for 3D graphics display. The GPU 32 performs image processing using a memory specialized for image processing or a memory area which is a portion of the main memory 33. The GPU 32 uses these to generate object image data, game image data or movie video to be displayed on the monitor 2, and outputs the data via the memory controller 31 and the video I/F 37 to the monitor 2 as appropriate.

The main memory 33 is a memory area used in the CPU 30, and stores a game program or the like required for a process by the CPU 30 as appropriate. For example, the main memory 33 stores a game program, various data, or the like read from the optical disc 4 by the CPU 30. The game program, the various data, or the like stored in the main memory 33 are executed by the CPU 30.

The DSP 34 processes sound data or the like which is generated in the CPU 30 when a game program is executed. The ARAM 35 for storing the sound data or the like is connected to the DSP 34. The ARAM 35 is used when the DSP 34 performs a predetermined process (e.g., storage of a read-ahead game program or sound data). The DSP 34 reads sound data stored in the ARAM 35, and outputs the data via the memory controller 31 and the audio I/F 39 to the loudspeaker 2a included in the monitor 2.

The memory controller 31 performs a centralized control of data transfer. The above-described various I/Fs are connected to the memory controller 31. The controller I/F 36 is composed of, for example, four controller I/Fs 36a to 36d, and communicably connects an external apparatus which can be engaged with the four controller I/Fs 36a to 36d via connectors thereof, and the game apparatus 3. For example, the reception unit 6 is engaged with the connector to be connected via the controller I/F 36 to the game apparatus 3. As described above, the reception unit 6 receives transmission data from the controller 7, and outputs the transmission data via the controller I/F 36 to the CPU 30. The monitor 2 is connected to the video I/F 37. The external memory card 5 is connected to the external memory I/F 38, thereby making it possible to access a backup memory or the like provided in the external memory card 5. The loudspeaker 2a included in the monitor 2 is connected to the audio I/F 39 so that sound data read from the ARAM 35 by the DSP 34 or sound data directly output from the disc drive 40 can be output from the loudspeaker 2a. The disc drive 40 is connected to the disc I/F 41. The disc drive 40 reads data stored at a predetermined read-out position on the optical disc 4, and outputs the data to the bus and the audio I/F 39 of the game apparatus 3.

Figure 3:
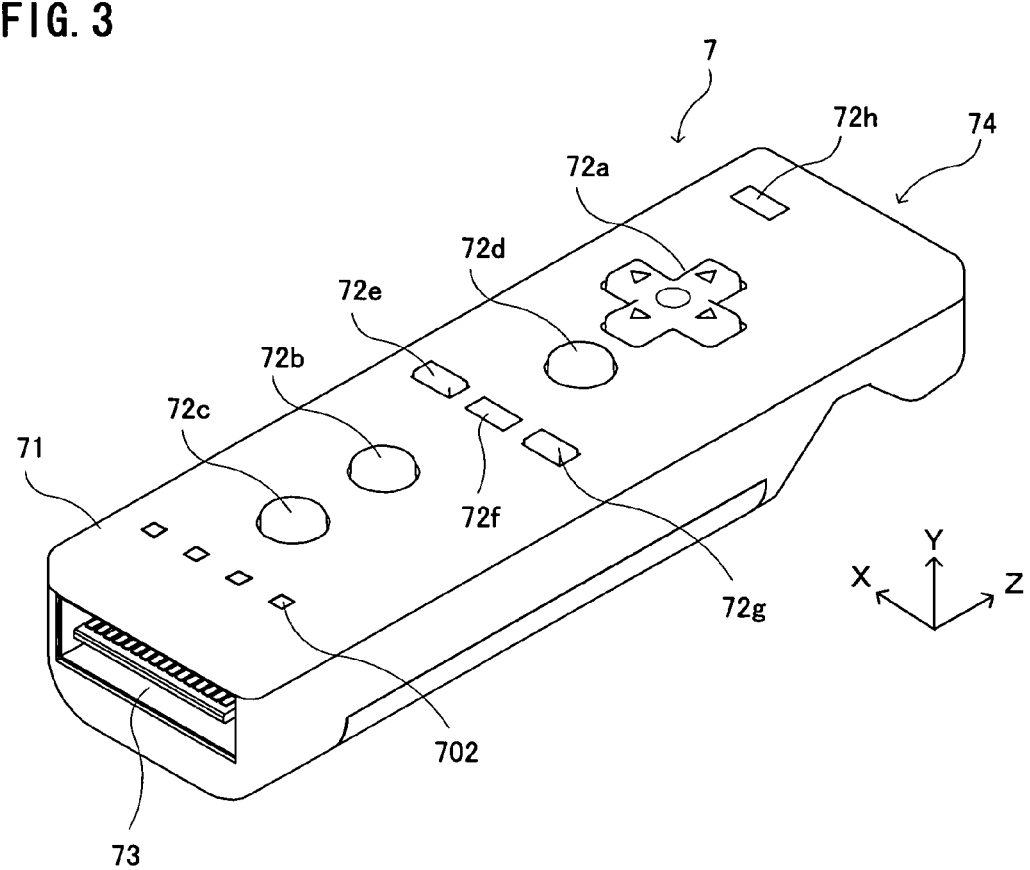
FIG. 3 is a perspective view of a controller 7 of FIG. 1 as viewed from the top and the rear.
Figure 4:
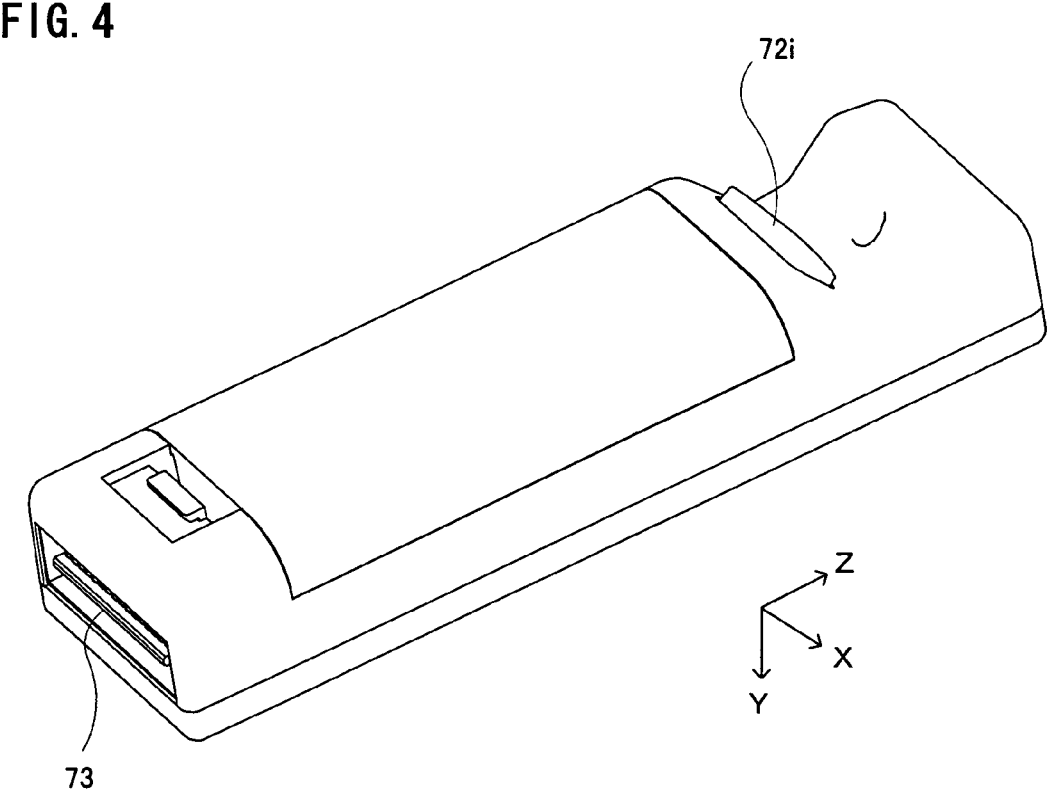
FIG. 4 is a perspective view of the controller 7 of FIG. 1 as viewed from the bottom and the rear.

The controller 7 which is an exemplary input device will be described with reference to FIGS. 3 and 4. Note that FIG. 3 is a perspective view of the controller 7 as viewed from the top and the rear. FIG. 4 is a perspective view of the controller 7 as viewed from the bottom and the rear.

In FIGS. 3 and 4, the controller 7 has a housing 71 formed by, for example, plastic molding. The housing 71 is provided with a plurality of operation sections 72. The housing 71 is in the shape of substantially a rectangular parallelepiped where a front-to-rear direction is a longitudinal direction. The whole housing 71 has a size which allows an adult and a child to hold the controller 7 with one hand.

A cross key 72a is provided on a central portion closer to a front side of an upper surface of the housing 71. The cross key 72a is a four-direction push switch in the shape of a cross, and has operation portions corresponding to the respective four directions (frontward, rearward, leftward, and rightward) indicated by arrows, the operation portions being provided at the respective projecting pieces of the cross which are arranged at intervals of 90°. Any of the frontward, rearward, leftward and rightward directions is selected by a player pushing down any of the operation portions of the cross key 72a. For example, by a player operating the cross key 72a, a movement direction of a player character or the like appearing in a virtual game world can be designated, or a movement direction of a cursor can be designated.

Note that the cross key 72a is an operation section which outputs an operation signal, depending on the above-described direction input operation of a player, or may be an operation section of other embodiments. For example, a complex switch composed of a push switch having four direction operation portions arranged in a ring shape, and a center switch provided at a center thereof, may be provided instead of the cross key 72a. Also, instead of the cross key 72a, an operation section may be provided which outputs an operation signal, depending on a tilt direction of a tiltable stick which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a. Also, instead of the cross key 72a, an operation section may be provided which outputs an operation signal, depending on which is pushed down among switches indicating at least four directions (frontward, rearward, leftward, and rightward).

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of an X button, a Y button, a B button, and the like are assigned to the operation buttons 72b to 72d. Functions of a select switch, a menu switch, a start switch, and the like are assigned to the operation buttons 72e to 72g. Although the operation buttons 72b to 72g are assigned the respective functions, depending on a game program executed by the game apparatus 3, those are not directly involved with the description of the example embodiment presented herein and will not be described in detail. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that a player is prevented from unintentionally and erroneously pushing down the button.

An operation button 72h is provided at the front of the cross key 72a on the upper surface of the housing 71. The operation button 72h is a power supply switch which remotely switches ON/OFF a power supply for the main body of the game apparatus 3. The operation button 72h is also a button of a type whose upper surface is buried below the upper surface of the housing 71 so that a player is prevented from unintentionally and erroneously pushing down the button.

A plurality of LEDs 702 are provided at the rear of the operation button 72c of the upper surface of the housing 71. Here, the controller 7 is assigned controller identification (number) so as to distinguish it from other controllers 7. For example, the LEDs 702 are used so as to inform the player of controller identification currently set for the controller 7. Specifically, when transmission data is transmitted from the controller 7 to the reception unit 6, one of the plurality of LEDs 702 is turned ON, depending on the controller identification.

On the other hand, a hollow portion is formed on a lower surface of the housing 71. The hollow portion on the lower surface of the housing 71 is formed at a position where the index finger or the middle finger of a player is placed when the player holds the controller 7, as specifically described below. An operation button 72i is provided on a rear slope surface of the hollow portion. The operation button 72i is an operation section which functions as, for example, an A button, and which is used as a trigger switch for a shooting game, or for an operation of causing a player object to be noticeable with respect to a predetermined object, or the like.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A connector 73 is provided on a rear surface of the housing 71. The connector 33 is, for example, a 32-pin edge connector which is utilized so as to be engaged and connected with a connection cable.

Here, to specifically describe the example embodiment, a coordinate system which is provided with respect to the controller 7 is defined. As illustrated in FIGS. 3 and 4, X, Y and Z axes, which are orthogonal to each other, are defined with respect to the controller 7. Specifically, a front-to-rear direction of the controller 7 (a longitudinal direction of the housing 71) is assumed to be the Z axis, and a front (a surface on which the image capture information computing section 74 is provided) direction of the controller 7 is assumed to be the positive direction of the Z axis. A vertical direction of the controller 7 is assumed to be the Y axis, and an upper surface (a surface on which the cross key 72a and the like are provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5A:
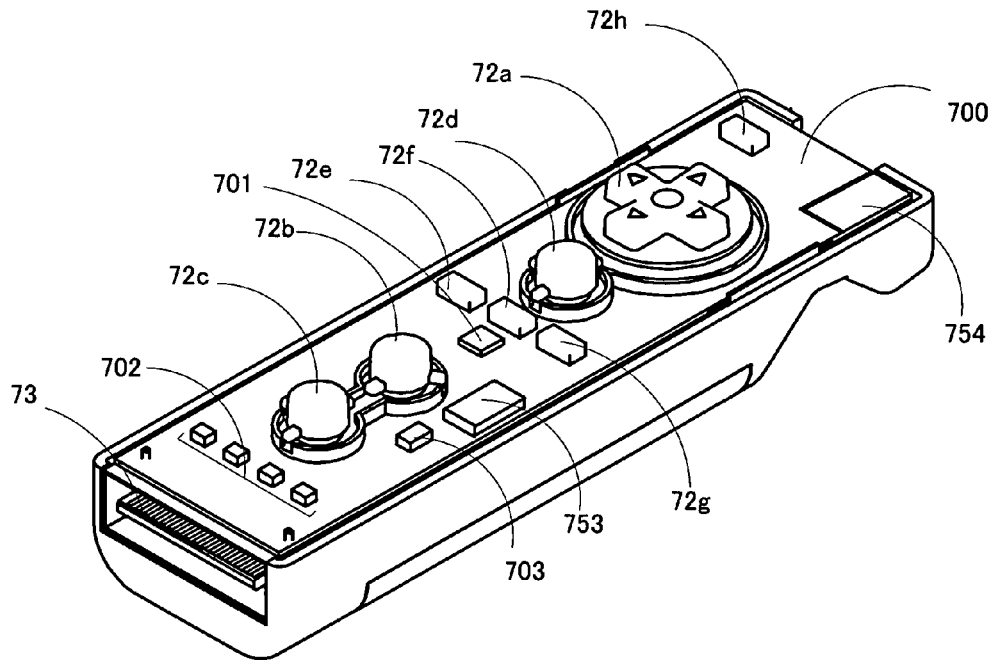
FIGS. 5A and 5B are perspective views of the controller 7 where a portion of a housing is cut away.
Figure 5B:
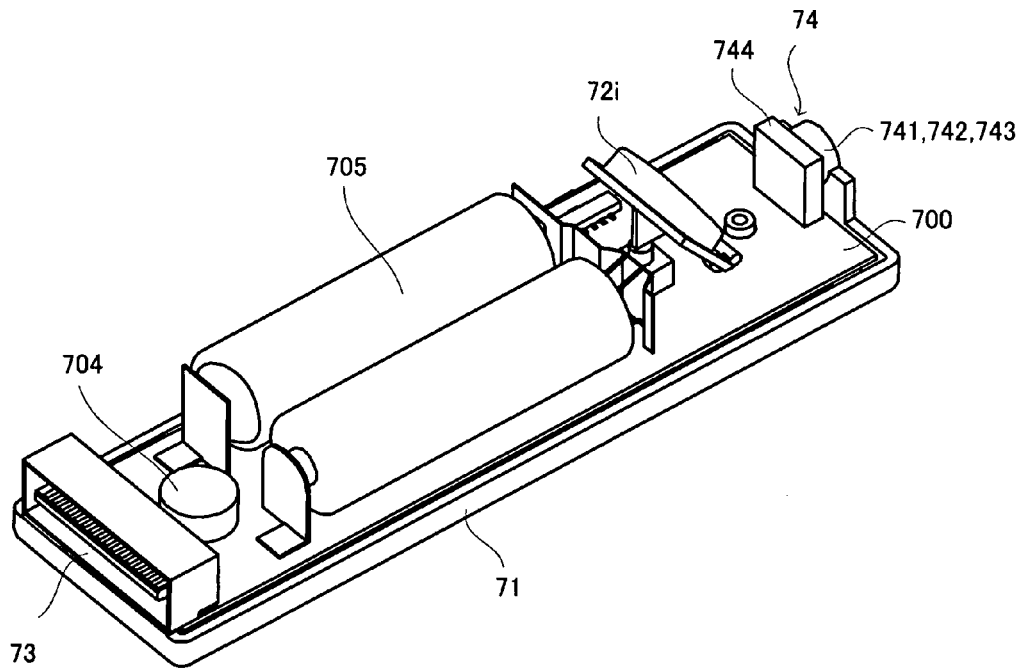

Next, an internal structure of the controller 7 will be described with reference to FIGS. 5A and 5B. Note that FIG. 5A is a perspective view of the controller 7 where an upper housing (a portion of the housing 71) is cut away. FIG. 5B is a perspective view of the controller 7 where a lower housing (a portion of the housing 71) is cut away. FIG. 5B illustrates a perspective view of a base board 700 of FIG. 5A as viewed from a bottom surface thereof.

In FIG. 5A, the base board 700 is fixed inside the housing 71. On an upper major surface of the base board 700, the operation buttons 72a to 72h, an acceleration sensor 701, the LEDs 702, a quartz oscillator 703, a radio module 753, an antenna 754, and the like are provided. These are connected to a microcomputer 751 (see FIG. 6) via a conductor (not shown) formed on the base board 700 and the like. The acceleration sensor 701 detects and outputs an acceleration, which can be used to calculate a tilt, a vibration, or the like in a three-dimensional space in which the controller 7 is placed.

Figure 6:
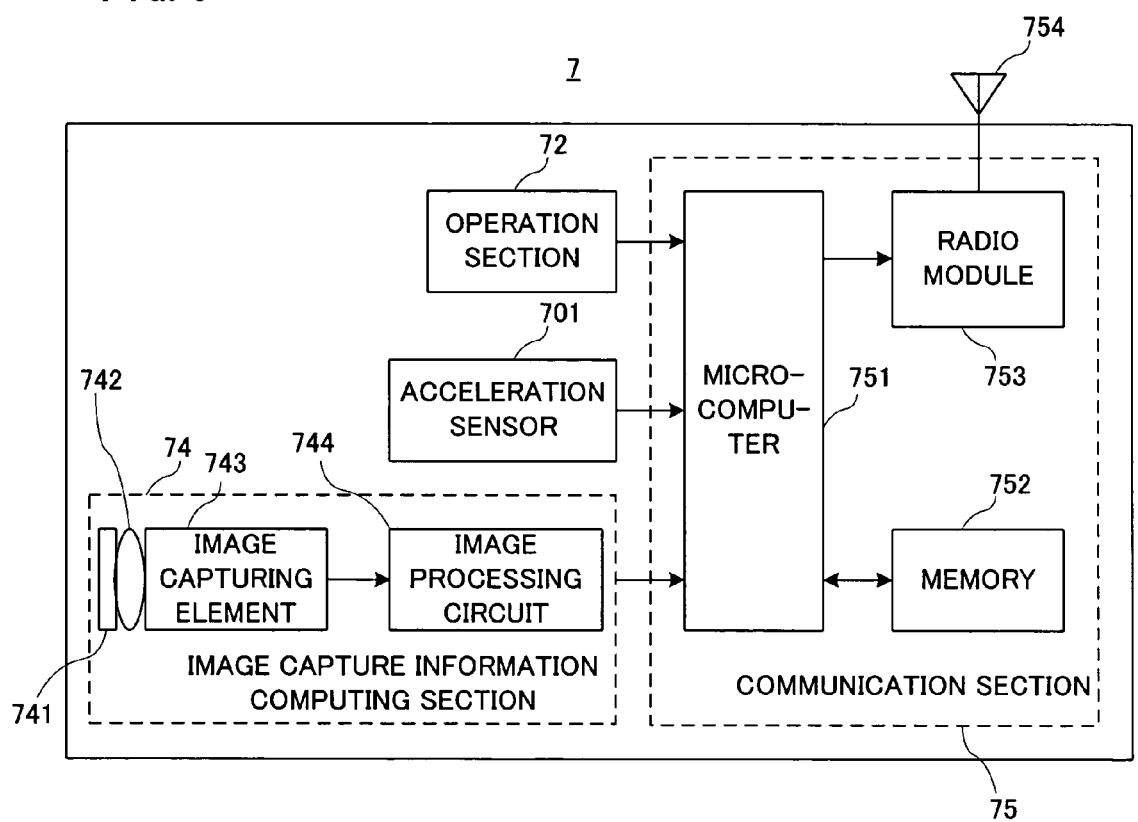
FIG. 6 is a block diagram illustrating a configuration of the controller 7.

More specifically, as illustrated in FIG. 6, the controller 7 preferably comprises a three-axis acceleration sensor 701. The three-axis acceleration sensor 701 detects linear accelerations in three directions, i.e., the vertical direction (the Y axis of FIG. 3), the lateral direction (the X axis of FIG. 3), and the front-to-rear direction (the Z axis of FIG. 3). In other embodiments, a two-axis acceleration detecting means for detecting only a linear acceleration in each of the X axis and the Y axis (or other pairs of axes), may be employed, depending on the type of a control signal used in a game process. For example, the three- or two-axis acceleration sensor 701 may be of a type which is available from Analog Devices, Inc. or STMicroelectronics N.V. The acceleration sensor 701 is preferably of a capacitance type (capacitance coupling type) based on a technique of MEMS (Micro Electro Mechanical Systems) obtained by micromachining silicon. However, the three- or two-axis acceleration sensor 701 may be provided using a technique of existing acceleration detecting means (e.g., a piezoelectric type or a piezoelectric resistance type) or other appropriate techniques which will be developed in the future.

As is known to those skilled in the art, an acceleration detecting means used as the acceleration sensor 701 can detect only an acceleration (linear acceleration) along a straight line corresponding to each axis of an acceleration sensor. In other words, a direct output from the acceleration sensor 701 is a signal indicating a linear acceleration (static or dynamic) along each of the two or three axes. Therefore, the acceleration sensor 701 cannot directly detect physical properties, such as a motion along a non-linear path (e.g., an arc, etc.), a rotation, a rotational motion, an angular displacement, a tilt, a position, an attitude, and the like.

However, it would be easily understood by those skilled in the art from the description of the present specification that further information about the controller 7 can be estimated or calculated (determined) by performing an additional process with respect to an acceleration signal output from the acceleration sensor 701. For example, when a static acceleration (gravity acceleration) is sensed, an output from the acceleration sensor 701 is used to perform a computation using a tilt angle and the detected acceleration, thereby making it possible to determine a tilt of a subject (the controller 7) with respect to a gravity vector. Thus, by using the acceleration sensor 701 in combination with the microcomputer 751 (or other processors), the tilt, attitude or position of the controller 7 can be determined. Similarly, for example, when the controller 7 comprising the acceleration sensor 701 is dynamically accelerated and moved by a user's hand as described below, various motions and/or positions of the controller 7 can be calculated by processing an acceleration signal generated by the acceleration sensor 701. In other examples, the acceleration sensor 701 may comprise an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravity acceleration) by the acceleration sensor, may be for converting a sensed acceleration signal into a tilt angle corresponding thereto (or other preferable parameters).

The controller 7 functions as a wireless controller by means of the communication section 75 having the radio module 753 and the antenna 754. Note that the quartz oscillator 703 generates a basic clock for the microcomputer 751 (described below).

On the other hand, in FIG. 5B, the image capture information computing section 74 is provided at a front edge of a lower major surface of the base board 700. The image capture information computing section 74 is composed of an infrared filter 741, a lens 742, an image capturing element 743, and an image processing circuit 744, which are attached to the lower major surface of the base board 700 in this order from the front of the controller 7. The connector 73 is attached to a rear edge of the lower major surface of the base board 700. The operation button 72i is attached at the rear of the image capture information computing section 74 and on the lower major surface of the base board 700. Batteries 705 are housed at the rear of the operation button 72i. A vibrator 704 is attached on the lower major surface of the base board 700 and between the batteries 705 and the connector 73. The vibrator 704 may be, for example, a vibration motor or a solenoid. Vibration occurs in the controller 7 by an action of the vibrator 704, and is transferred to a player who is holding the controller 7, thereby achieving a so-called vibration feature-supporting game.

Next, an internal configuration of FIG. 6 will be described with reference to FIG. 6. Note that FIG. 6 is a block diagram illustrating the configuration of the controller 7.

The image capture information computing section 74 includes the infrared filter 741, the lens 742, the image capturing element 743, and the image processing circuit 744. The infrared filter 741 passes only infrared light entering from the front of the controller 7. Here, the markers 8L and 8R which are provided in the vicinity of the display screen of the monitor 2, are infrared LEDs which output infrared light toward the front of the monitor 2. Therefore, images of the markers 8L and 8R can be more accurately captured by providing the infrared filter 741. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data (captured images of the markers 8L and 8R) obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself. Based on the process result data output by the image capture information computing section 74, a signal corresponding to a position or a motion of the controller 7 can be obtained, and based on the signal, input coordinates in the screen coordinate system of the monitor 2 can be obtained. In other words, the controller 7 functions as a pointing device based on the process result data output by the image capture information computing section 74.

As described above, the acceleration sensor 701 is a sensor which senses and outputs an acceleration with respect to each of the three components of the controller 7, i.e., the vertical direction (Y-axis direction), the lateral direction (X-axis direction), and the front-to-rear direction (Z-axis direction). Data indicating accelerations corresponding to the three axial components sensed by the acceleration sensor 701, is output to the communication section 75. Based on the acceleration data output from the acceleration sensor 701, a motion of the controller 7 can be determined. Note that the acceleration sensor 701 may be an acceleration sensor for detecting an acceleration with respect to each of any two of the three axes, depending on data required for a specific application.

The communication section 75 comprises the microcomputer 751, a memory 752, the radio module 753, and the antenna 754. The microcomputer 751 controls the radio module 753 for wirelessly transmitting transmission data while using the memory 752 as a memory area during a process.

An operation signal (key data) from the operation section 72 provided in the controller 7, acceleration signals in the three axial directions (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, and the process result data), as transmission data to be transmitted to the reception unit 6, into the memory 752. Here, radio transmission from the communication section 75 to the reception unit 6 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the reception unit 6 arrives, the microcomputer 751 outputs transmission data stored in the memory 752, as a series of pieces of operation information, to the radio module 753. Thereafter, the radio module 753 emits the operation information, as a radio signal, from the antenna 754 using a carrier wave by means of, for example, the Bluetooth® technique. Specifically, the key data from the operation section 72 provided in the controller 7, the X-, Y- and Z-axis direction acceleration data from the acceleration sensor 701, and the process result data from the image capture information computing section 74 are transmitted from the controller 7. Thereafter, the reception unit 6 of the game apparatus 3 receives the radio signal, and the game apparatus 3 demodulates or decodes the radio signal, thereby obtaining a series of pieces of operation information (the key data, the X-, Y- and Z-axis direction acceleration data, and the process result data). Thereafter, the CPU 30 of the game apparatus 3 performs a game process based on the obtained operation information and a game program. Note that, when the communication section 75 is configured using the Bluetooth® technique, the communication section 75 can also have a function of receiving transmission data wirelessly transmitted from other devices.

Figure 7:
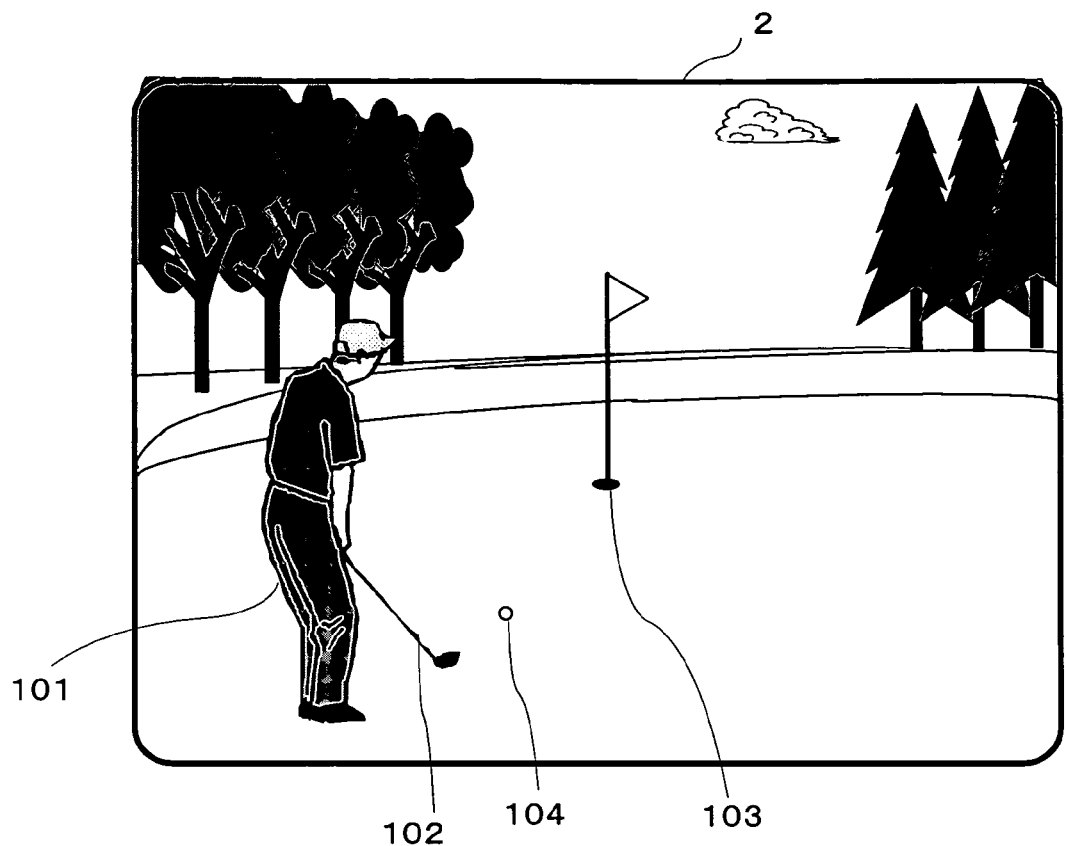
FIG. 7 is a diagram illustrating an exemplary game screen of a game assumed in this embodiment.
Figure 8:
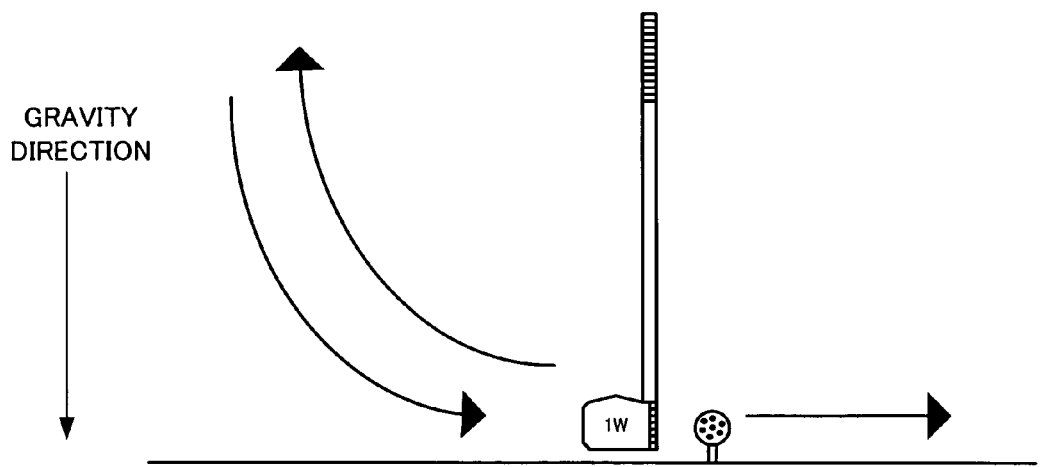
FIG. 8 is a diagram illustrating an image indicating a swinging motion of a golf club.
Figure 9:
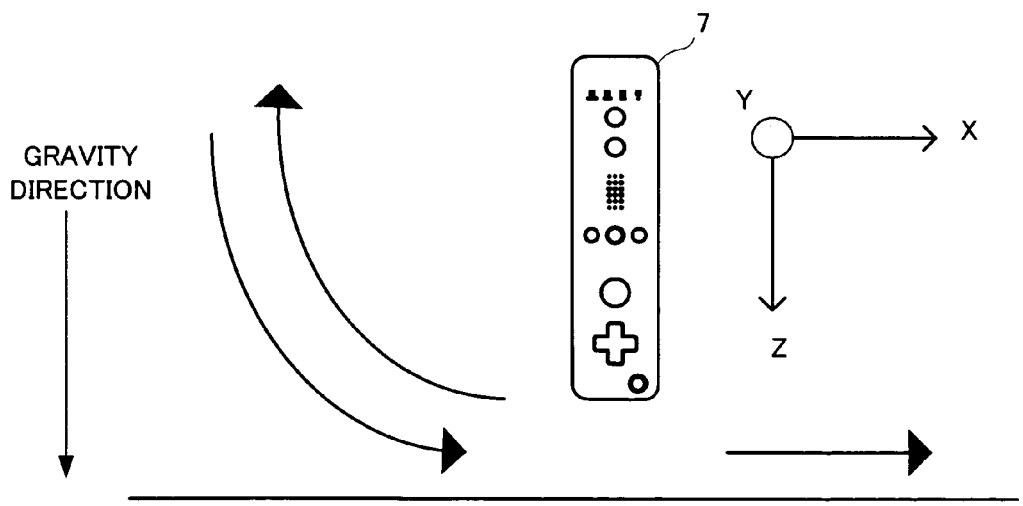
FIG. 9 is a schematic diagram illustrating a motion of swinging the controller 7, where the controller 7 is assumed to be a golf club.

Next, a game assumed in this embodiment will be roughly described with respect to FIGS. 7 to 9. The game assumed in this embodiment is a golf game. FIG. 7 illustrates an exemplary screen of the game assumed in this embodiment. In FIG. 7, the monitor 2 displays a player object 101 holding a golf club 102, a cup 103, and a ball 104. When a player performs a swinging motion (e.g., shot, putting, etc.), assuming the controller 7 as a golf club, a motion of the player object 101 swinging the golf club 102 is drawn in association with the player's motion. FIG. 8 is a schematic diagram illustrating a motion of swinging a golf club, and FIG. 9 is a schematic diagram illustrating a motion of swinging the controller 7 which corresponds to the motion of FIG. 8, where the controller 7 is assumed to be a golf club.

Specifically, the player selects a club type and determines a hitting direction before swinging the controller 7 in a manner with which the player swings a golf club. The game apparatus 3 of this embodiment calculates a value of a swing strength based on acceleration data obtained from the controller 7. Conventionally, the swing strength value (hereinafter referred to as a swing power) is directly used as a shot power. In this embodiment, the swing power is corrected by a process described below and the corrected swing power is used as a shot power. The shot power is multiplied by parameters, such as an initial speed set for each type of the golf club 102, and current conditions in the game (wind speed, etc.), to determine a carry distance of the ball 104. For example, if a swing is excessively strong, the ball 104 can reach a long distance, however, the ball 104 may go beyond the cup 103. If a swing is excessively weak, the ball 104 may fall short of the cup 103. Therefore, as in actual golf, the player needs to adjust the swing strength of the controller 7, depending on a distance to the cup 103.

Figure 10A:
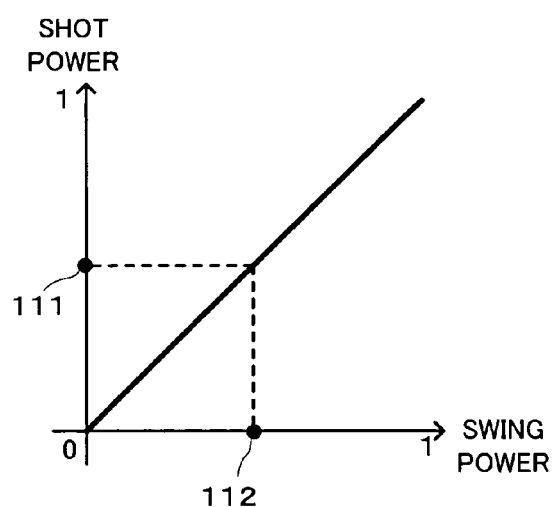
FIGS. 10A to 10C are graphs illustrating relationships between swing powers and shot powers.

Here, a relationship between a player's swing power and a shot power processed in the game, will be described with reference to FIGS. 10A to 10C. In graphs of FIGS. 10A to 10C, the vertical axis represents the shot power and the horizontal axis represents the swing power. FIG. 10A is a graph illustrating the relationship when a correction process described below of this embodiment is not performed (i.e., a conventional process). In the graph of FIG. 10A, the swing power is directly used as the shot power, so that a relationship of the swing power=the shot power is established. A point having a best shot power is indicated by 111. The best shot power refers to a shot power which drives the ball 104 to a position closest to the cup 103, and is determined based on a club type, a hitting direction, and conditions in the game when the player performs a swing operation. This is because it is generally considered that the placement of a ball close to a cup leads to a best result for the player. In other words, the best shot power means a shot power which provides a best result for the player (i.e., an event most advantageous to the player), depending on the contents of a current game. When the best shot power is at the point 111, a swing power which leads to the best shot power (hereinafter referred to as a best swing power) is present only at a single point (point 112).

Figure 10B:
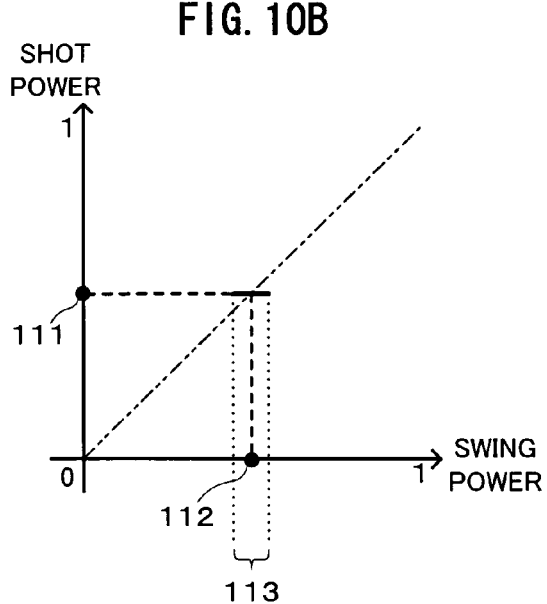
Figure 10C:
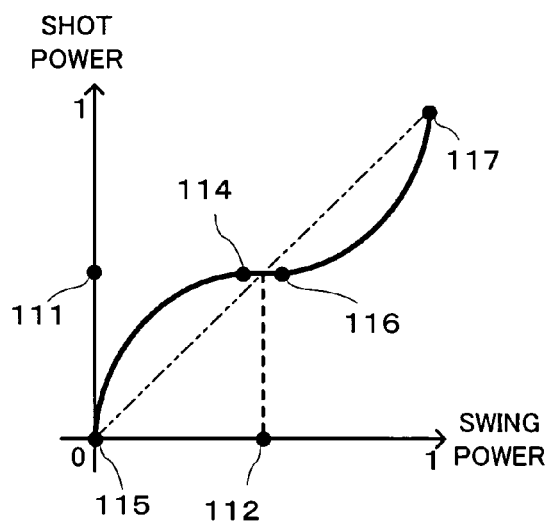

On the other hand, in this embodiment, as indicated by the graph of FIG. 10B, a predetermined swing power range 113 ranging around the point 112 (the best swing power) as a center can lead to the best shot power. In other words, even when a player's swing power falls slightly short of or slightly exceeds the best swing power, the swing power is processed as a best shot in the game. The process will be described in detail below. In this embodiment, initially, the best swing power (the point 112) is previously calculated before the player performs a swing operation. The predetermined range 113 around the best swing power as a center is set as a conversion range. If a swing power has a value which falls within the conversion range, the swing power is converted into the best shot power (the point 111), and a process of hitting a ball with the best shot power is performed. In other words, within the conversion range, a swing power is converted into the best shot power instead of being directly converted into a shot power.

Further, swing powers outside the conversion range are subjected to Hermitian interpolation, and the results are used as shot powers. Here, the Hermitian interpolation will be described. The Hermitian interpolation is an interpolation method of performing interpolation while adjusting a change rate, taking into consideration two adjacent values and change amounts at both the points. In this embodiment, in the graph of FIG. 10B, regarding a left side with respect to the conversion range, initially, a left end point of the conversion range and a point having a swing power of 0 are interpolated by the Hermitian interpolation. In the interpolation, it is assumed that the left end point has a vector having a rightward direction and a magnitude of 1, and the point having a swing power of 0 has a vector having an upper-right direction (45 degrees) and a magnitude of 1. Values on a curve obtained by the interpolation are assumed to be shot powers. Regarding a right side with respect to the conversion range, a right end point of the conversion range and a point having an upper swing power limit are interpolated by the Hermitian interpolation, and values on the resultant curve are assumed to be shot powers. In the interpolation, it is assumed that the right end point has a vector having a rightward direction and a magnitude of 1, and the point having the upper swing power limit has a vector having an upper-right direction (45 degrees) and a magnitude of 1. The graph of FIG. 10C illustrates a relationship between the swing power and the shot power as a result of the Hermitian interpolation. In the graph of FIG. 10C, the left end point 114 of the conversion range and the point 115 having a swing power of 0 are connected by the Hermitian interpolation. Also, the right end point 116 of the conversion range and the point 117 having a swing power of 1 are connected by the Hermitian interpolation. Therefore, regarding the conversion from the swing power to the shot power, as compared to the graph of FIG. 10A, swing powers are converted to values closer to the best shot power as a whole.

Thus, in this game, if a swing power falls within the predetermined range before and after the best swing power value, a process of performing a shot using the best shot power value is performed. In other words, if a swing power has a strength close to the best swing power value to some extent, a process of hitting a ball with the best shot power is performed. As a result, even when the strength of a player's swing falls slightly short of or slightly exceeds the best power, the ball 104 can be caused to approach (or enter) the cup 103, thereby making it possible to reduce the difficulty of the game and allow the player to comfortably enjoy playing the game. In addition, even when a swing power is outside the predetermined range, since a corresponding value obtained by the Hermitian interpolation is used as a shot power, the difficulty of the game can be reduced, so that the game can be adjusted so that the player can enjoy comfortably.

Figure 11:
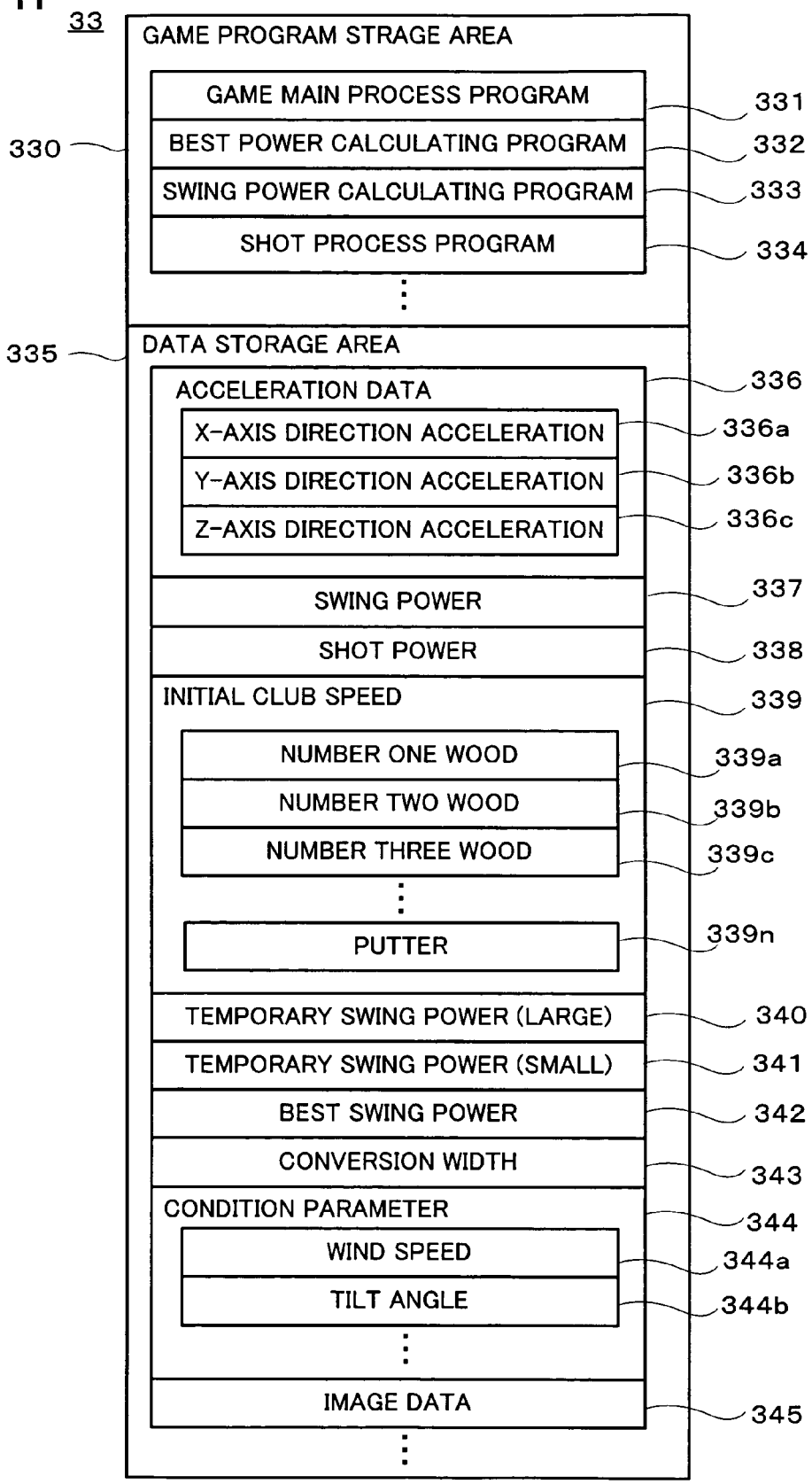
FIG. 11 is a diagram illustrating a memory map of a main memory 33.

Next, a game process executed by the game apparatus 3 will be described in detail. Firstly, a program and data stored in the main memory 33 during the game process will be described. FIG. 11 is a diagram illustrating a memory map of the main memory 33 of FIG. 2. In FIG. 11, the main memory 33 includes a game program storage area 330 and a data storage area 335.

The game program storage area 330 stores the game program which is executed by the CPU 30. The game program is composed of a game main process program 331, a best power calculating program 332, a swing power calculating program 333, a shot process program 334, and the like.

The game main process program 331 is a program for controlling the whole process of this embodiment.

The best power calculating program 332 is a program for calculating a swing power which drives a ball to a position closest to a cup, i.e., the best swing power.

The swing power calculating program 333 is a program for converting acceleration data when a player swings the controller 7, into a swing power. Specifically, the swing power calculating program 333 is a program for converting acceleration data obtained in the range of −2 G to +2 G into a swing power in the range of 0 to 1.

The shot process program 334 is a program for hitting a ball based on a shot power obtained from a swing power.

In the data storage area 335, data, such as acceleration data 336, a swing power 337, a shot power 338, an initial club speed 339, a temporary swing power (large) 340, a temporary swing power (small) 341, a best swing power 342, a conversion width 343, condition data 344, image data 345, and the like, are stored, and various flags used in a game process are also stored.

The acceleration data 336 is acceleration data included in a series of pieces of operation information transmitted as transmission data from the controller 7, and the obtained acceleration data is stored in an amount corresponding to a predetermined number of frames (e.g., 30 frames where one frame (1/60 sec) corresponds to a game process interval). The acceleration data 336 includes an X-axis direction acceleration $336a$, a Y-axis direction acceleration $336b$, and a Z-axis direction acceleration $336c$ which are detected with respect to three axial components of the X, Y and Z axes by the acceleration sensor 701. Note that the reception unit 6 included in the game apparatus 3 receives the acceleration data 336 included in operation information transmitted from the controller 7 in predetermined intervals of 5 ms, and the acceleration data 336 is stored into a buffer (not shown) included in the reception unit 6. Thereafter, the acceleration data 336 is read out per frame (game process interval) and is stored into the main memory 33. The acceleration data 336 has a value in the range of −2 G to +2 G.

The swing power 337 is a value obtained by converting the acceleration data 336 using the swing power calculating program. This value is used as a value indicating a swing strength of the controller 7. The swing power 337 has a value in the range of 0 to 1 in 0.01 steps.

The shot power 338 is a power with which a ball is hit. The shot power 338 has a value obtained by converting a swing power by a process described below. As is similar to the swing power, the shot power 338 has a value in the range of 0 to 1. Based on this value, a carry distance of a ball is determined in the shot process program 334.

The initial club speed 339 is a value which is previously set, corresponding to each golf club, and data which indicates an initial speed given to a ball when the swing power is maximum (1). The data ranges from number one wood 339a to putter 339n, depending on the golf club type.

The temporary swing power (large) 340 and the temporary swing power (small) 341 are variables which are used when a best power is obtained in a best power calculating process described below. The best swing power 342 is a best swing power calculated by the best power calculating program 332, i.e., a swing power which drives a ball to a position closest to a cup.

The conversion width 343 is a data for indicating the above-described predetermined range within which a swing power is converted into the best shot power. This width varies, depending on the difficulty of a game. The condition data 344 is data for indicating natural conditions in a virtual game space, including a wind speed 344a, a slope angle 344b, and the like. The image data 345 is image data for various objects which appear in the virtual game space, including the player object 101, golf courses, and the like.

Figure 12:
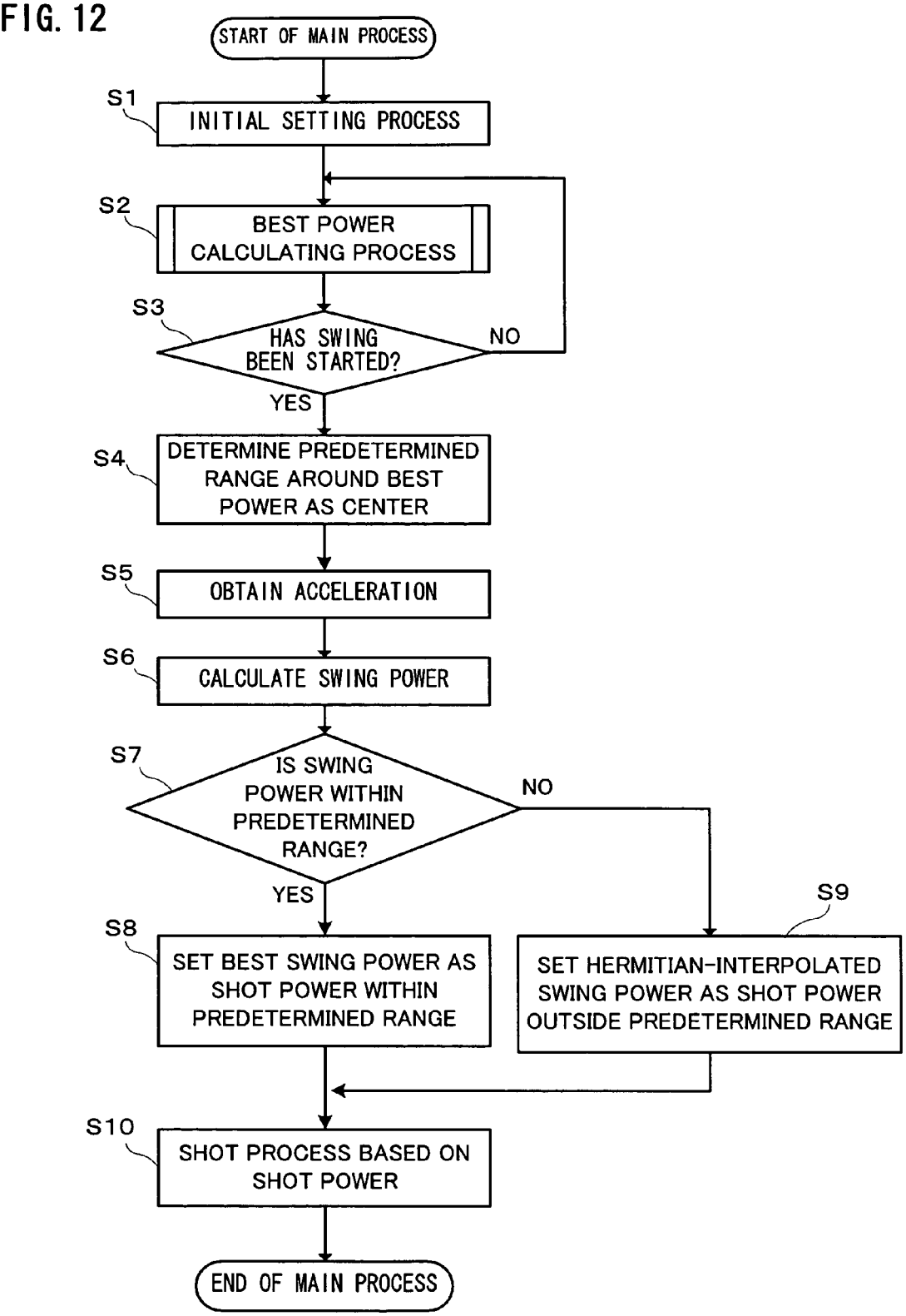
FIG. 12 is a flowchart of a game process according to an example embodiment.

Next, a flow of a game process performed in the game apparatus 3 will be described with reference to FIGS. 12 and 13. FIG. 12 is a flowchart of the game process executed in the game apparatus 3. When the game apparatus 3 is powered ON, the CPU 30 of the game apparatus 3 executes a boot program stored in a boot ROM (not shown) to initialize each unit, such as the main memory 33 and the like. Thereafter, a game program stored on the optical disc 4 is read into the main memory 33, and execution of the game program is started. As a result, a game image is displayed via the GPU 32 on the monitor 2, so that a game is started. Thereafter, processes of the flowchart of FIG. 12 are executed. The game of this embodiment is a golf game as described above, and the processes are related to shot and putting motions of a golf club. Other processes related to the golf game (selection of a course, calculation of a trajectory of a shot ball, etc.) are not directly related to the present invention, and will not be described.

In FIG. 12, initially, the CPU 30 performs an initial setting process (step S1). In this process, setting of the difficulty of the game, setting of player object parameters (a power and a technique), setting of natural condition parameters (a wind speed, etc.), setting of an initial club, setting of an initial direction (a direction in which a ball is hit), and the like are performed. Also, the various variable and flags, such as the temporary swing power (large) 340 and the like, are initialized.

Next, the CPU 30 performs a best power calculating process (step S2). This process is a process for calculating a swing power corresponding to a shot power which drives a ball to a position closest to a cup (a swing power which is converted to a shot power which drives a ball to a position closest to a cup), i.e., a best swing power, assuming that the ball is hit under current conditions (a club type, a hitting direction, a wind speed, etc.). In this process, a position to which a ball is driven is calculated, assuming that a swing power=a shot power. Specifically, a position to which a ball is driven is calculated based on the graph of FIG. 10A. As a calculation method, in this process, upper and lower limit values of a swing power are compared, and one of the two points which can drive a ball to a position closer to a cup is obtained. Thereafter, the resultant value and a middle point of the two points are compared. The comparison process is repeatedly performed so as to approach a best swing power value.

Figure 13:
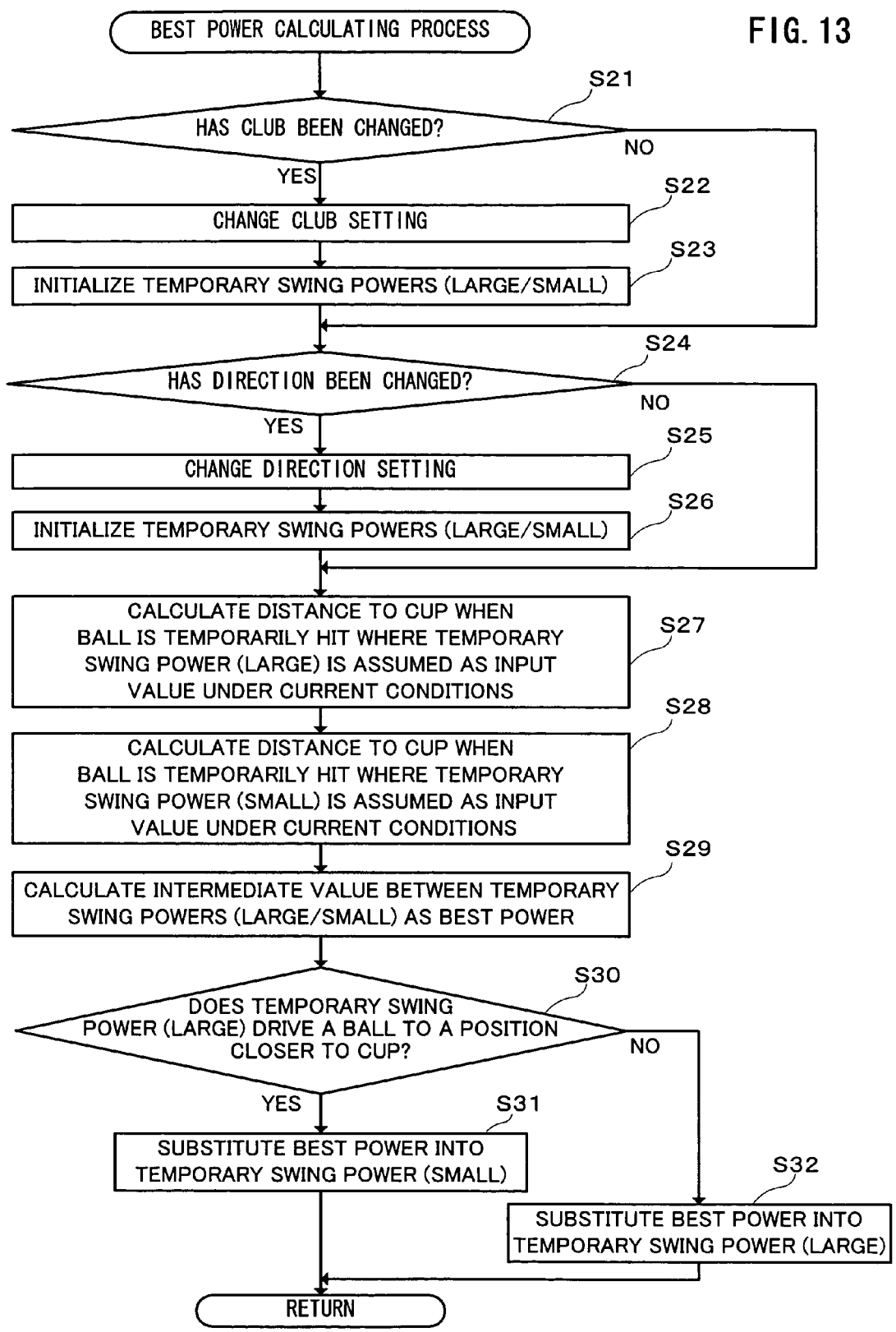
FIG. 13 is a flowchart illustrating a detail of a best power calculating process of step S2 of FIG. 12.

FIG. 13 is a flowchart illustrating a detail of the best power calculating process of step S2. In FIG. 13, initially, the CPU 30 determines whether or not a player has changed a club type (the presence or absence of an operation of changing a club) (step S21). As a result of the determination, when changing of a club has occurred (YES in step S21), the CPU 30 changes various set values of the previous club to those of a new club (step S22). Specifically, the initial club speed 339 and the like set for the new club are read out from the memory. Further, the CPU 30 initializes the temporary swing power (large) 340 and the temporary swing power (small) 341 (step S23). Specifically, the temporary swing power (large) 340 is set to be "1", and the temporary swing power (small) 341 is set to be "0". The CPU 30 goes to a process of step S24. On the other hand, when changing of a club has not occurred (NO in step S21), the CPU 30 directly goes to the process of step S24 without performing the processes of steps S22 and S23.

Next, the CPU 30 determines whether or not changing of a shot direction has occurred (the presence or absence of an operation of changing a shot direction) (step S24). As a result, if changing of a shot direction has occurred (YES in step S24), a direction setting is correspondingly changed (step S25). Further, as in step S23, the temporary swing power (large) 340 and the temporary swing power (small) 341 are initialized (step S26). The CPU 30 goes to a process of step S27. On the other hand, if changing of a shot direction has not occurred (NO in step S24), the CPU 30 directly goes to a process of step S27 without performing the processes of steps S25 and S26.

Next, the CPU 30 calculates a position to which a ball is driven, assuming that the ball is hit with the temporary swing power (large) 340 as a swing power under current conditions (a club type, a club direction, a wind speed, etc.) (as described above, here, the calculation is performed based on the relationship indicated in the graph of FIG. 10A). Further, a distance from the position to which the ball is driven to a cup is calculated (step S27).

Next, the CPU 30 calculates a position to which a ball is driven, assuming that the ball is hit with the temporary swing power (small) 341 as a swing power under the current conditions (a club type, a club direction, a wind speed, etc.). Further, a distance from the position to which the ball is driven to the cup is calculated (step S28). In other words, for example, regarding a first process after changing a club, a distance to the cup is calculated for each of the position to which the ball is driven when the ball is hit with full power (swing power=1) and the current ball position (swing power=0).

Next, the CPU 30 calculates an intermediate value between the temporary swing power (large) 340 and the temporary swing power (small) 341, and sets the intermediate value as the best swing power 342 (step S29).

Next, the CPU 30 compares the distances calculated in steps S27 and S28, to determine whether or not a ball can be driven to a position closer to the cup when the ball is hit with the temporary swing power (large) 340 (step S30). This is because it is considered that the placement of a ball close to a cup leads to a best result for the player, as described above. As a result of the determination, when the ball can be driven to a position closer to the cup when the ball is hit with the temporary swing power (large) 340 (YES in step S31), the value of the best swing power 342 is substituted into the temporary swing power (small) 341 (step S31). Conversely, when the ball can be driven to a position closer to the cup when the ball is hit with the temporary swing power (small) 341 (NO in step S31), the value of the best swing power 342 is substituted into the temporary swing power (large) 340 (step S32). Thus, the best power calculating process is completed. As described above, since this process is performed per frame, it is determined whether the ball can be driven to a position closer to the cup when the ball is hit with a swing power of 1 or 0, in the first process after changing a club, for example. When the ball can be driven to a position closer to the cup when the swing power is 1, a distance to the cup is compared between when the swing power is 0 and when the swing power is 0.5 in a process for the next frame. By repeatedly performing such a process, the swing power can be caused to approach the best swing power. Note that the best power calculating process is repeatedly performed until the start of a swing motion described below. However, if the temporary swing power (large) 340 and the temporary swing power (small) 341 become equal to each other during the repetition, the best power calculating process may be no longer performed at that time. This is because if the temporary swing power (large) 340 and the temporary swing power (small) 341 have the same value, it is considered that the best swing power has been calculated.

Referring back to FIG. 12, following the best power calculating process of step S2, the CPU 30 determines whether or not a player's swing motion has been started (step S3). This is determined based on, for example, a change in X-axis direction acceleration data. As a result, when a swing motion has not been started (NO in step S3), the CPU 30 returns to the process of step S2. In other words, the best power calculating process is repeatedly performed until a swing motion is started. On the other hand, when a swing motion has been started (YES in step S3), the CPU 30 goes to a process of step S4.

Figure 14A:
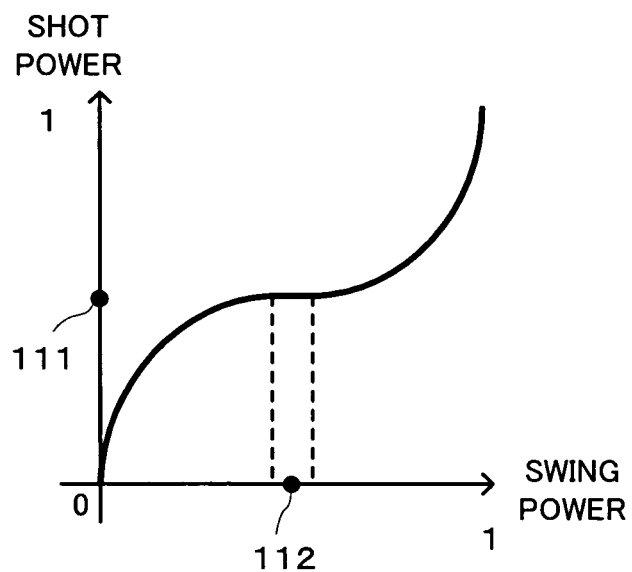
FIGS. 14A and 14B are diagrams for indicating a difference in conversion range due to a difficulty setting.
Figure 14B:
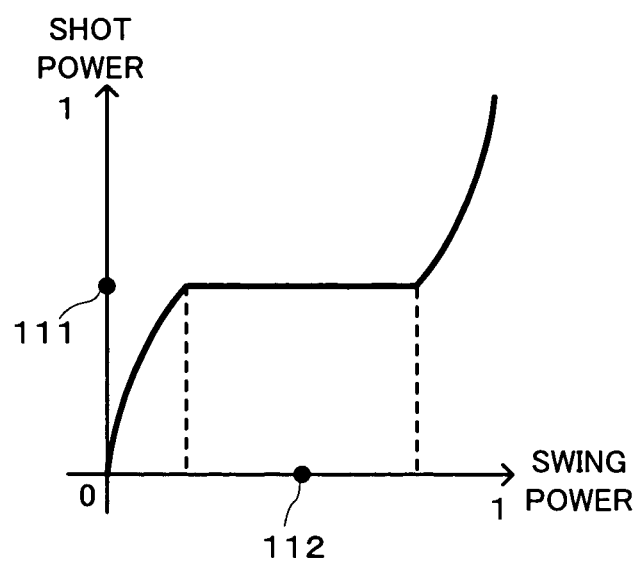

Next, the CPU 30 determines a predetermined range (i.e., a conversion range) around a best swing power value as a center of swing power values (step S4). The conversion range varies, depending on the game difficulty setting. For example, when the game difficulty is set to be "easy", the conversion width 343 is set to be −0.3 to +0.3. The CPU 30 reads out the setting from the conversion width 343, and sets the conversion range to be the range of −0.3 to +0.3 where the best swing power value is positioned at a center thereof. For example, when the game difficulty is set to be "ordinary", the conversion width 343 is set to be a range of −0.05 to +0.05. Similarly, the CPU 30 reads out the setting, and sets the conversion range to be the range of −0.05 to +0.05 where the best swing power value is positioned at a center thereof. FIGS. 14A and 14B are diagrams for illustrating exemplary conversion ranges depending on the difficulty setting. FIG. 14A illustrates a graph when the difficulty setting is "ordinary", and FIG. 14B illustrates a graph when the difficulty setting is "easy". The range in which a best shot is provided is broader in the graph of FIG. 10B than in the graph of FIG. 10A, so that a best shot can be more easily achieved.

Referring back to FIG. 12, next, the CPU 30 obtains the acceleration data 336 from the controller 7 (step S5). Following this, the CPU 30 calculates a swing power based on the acceleration data (step S6). This is performed by, for example, a process of observing a value of the acceleration data 336 per unit time within the predetermined range, and converting a most largely changing value into a swing power using a predetermined expression. For example, accelerations for past 30 frames are observed, and when a change in acceleration between 20th to 21st frames is largest, acceleration data for the frame (a range of −2 G to +2 G) is adopted to be converted into a swing power value (a range of 0 to 1). The method of obtaining acceleration data based on which conversion to a swing power is performed is not limited to this. A largest value of acceleration data within the predetermined range may be simply used. For example, one having a largest value of pieces of acceleration data for past 30 frames may be converted into a swing power.

Next, the CPU 30 determines whether or not the calculated swing power falls within the conversion range (step S7). As a result, when the calculated swing power falls within the conversion range (YES in step S7), the value of the best swing power 342 is set as the shot power 338 (step S8). In other words, when the swing power falls within the conversion range, the controller 7 is unconditionally swung with the best swing power. On the other hand, when the swing power does not fall within the conversion range, the swing power is subjected to the above-described Hermitian interpolation, and the resultant value (see the graph of FIG. 10C) is set as the shot power 338 (step S9).

Next, the CPU 30 performs a process of hitting the ball based on the value set in the shot power 338 (step S10). More specifically, a process for calculating the trajectory, carry distance and the like of the ball based on the value of the shot power 338, the initial club speed 339 of the currently selected club, a direction in which the ball is hit, and a condition parameter (e.g., a wind speed, etc.), and displaying how the ball is flied on the screen, is performed. As a result, if the swing power falls within the conversion range, a best shot can be unconditionally obtained. Thus, the game process of this embodiment is completed.

As described above, in this embodiment, when a swing power has a value within the predetermined range, the swing power is converted into a value which provides a best shot. Thereby, when an input operation is performed using, for example, a device which is difficult to enter an input desired by a player (adjustment of a swing strength of the controller 7, etc.), the input desired by the player can be reflected on a game irrespective of an actual input value. As a result, it is possible to prevent the player from being stressed since a desired input cannot be achieved, thereby making it possible to provide a comfortable game play. In the case of sports games of a type in which a ball is hit, such as a golf game, a tennis game, and the like, it is easier to achieve a best shot, thereby making it possible to reduce the game difficulty. Also, in the case of, for example, games of a type which is played by swinging the controller 7, assuming the controller 7 as a sword (swordplay game), by associating activation of a critical hit or a massively damaging act with the conversion range, the briskness of the game is increased, thereby making it possible to make the game more exciting. In other words, for general games of a type which is enjoyed by moving the controller 7, it can be made easier to input one which leads to a best result, depending on the contents of a game, among parameters obtained a series of operations of moving a controller, thereby making it possible to make the game more exciting.

Note that, in the above-described best power calculating process, the comparison algorithm in which the upper and lower limit values of a swing power and an intermediate value of these two points are utilized, is used. The calculation of a best swing power is not limited to this. For example, all possible swing power values may be examined to find a swing power which drives a ball to a position closest to a cup. Although a more computation amount is required, a best swing power value can be more accurately calculated.

The best shot power is defined in the above-described embodiment as a shot power which drives the ball 104 to a position closest to the cup 103. The example embodiment presented herein is not limited to this. The best shot power may be defined as a shot power which drives the ball 104 to a position which is designated by a player.

Since the game of the above-described embodiment is a golf game, the best shot power is defined as a shot power which drives a ball to a position closest to a cup. In other games (e.g., a baseball game), the best shot power may be defined as a shot power which drives a home run. In the case of a tennis game, for example, the best shot power is defined as a shot power which drives a ball to a position most distant from the opponent player in the opponent's court. This is because it is generally considered that it is most difficult for the opponent player to return a ball when the ball is driven to such a position. Thus, the best shot power may be defined as a value (best value) which provides a game event which is most advantageous to a player, depending on the contents and state of a game.

Figure 15:
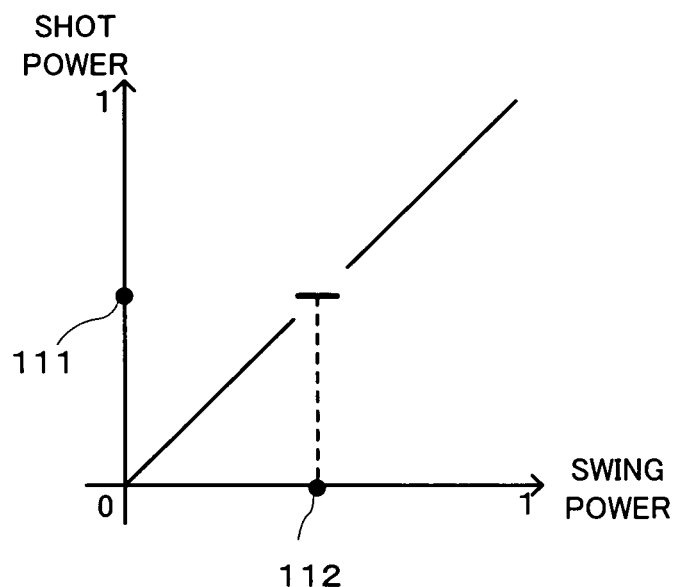
FIG. 15 is a graph illustrating an example where Hermitian interpolation is not performed outside a conversion range.
Figure 16:
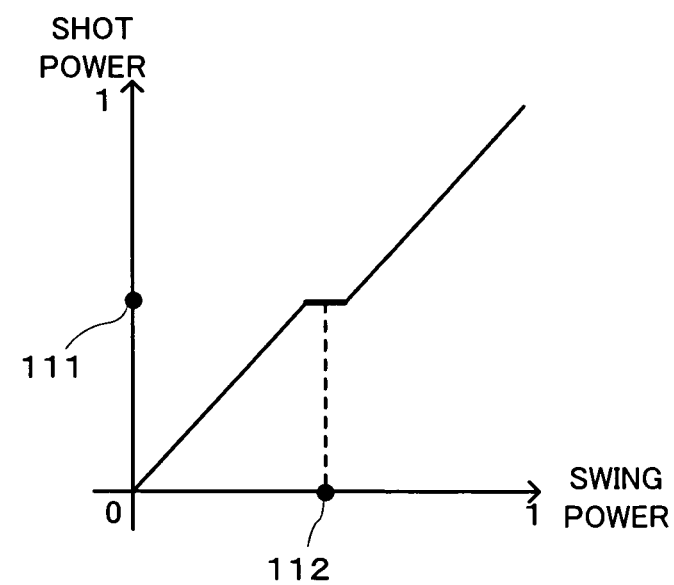
FIG. 16 is a graph illustrating an example where shot powers are continuous inside and outside the conversion range.

In the above-described embodiment, for swing powers outside the conversion range, shot powers obtained by the Hermitian interpolation are obtained. The Hermitian interpolation may not be performed. For example, as illustrated in FIG. 15, for swing powers outside the conversion range, a relationship that a swing power=a shot power may be established as in the conventional art. Also, in this case, the converted value (shot power) may be continuous regarding the inside and the outside of the conversion range. For example, as illustrated in FIG. 16, a shot power may be calculated so that the shot power value is continuous at a boundary of the conversion range.

Figure 17:
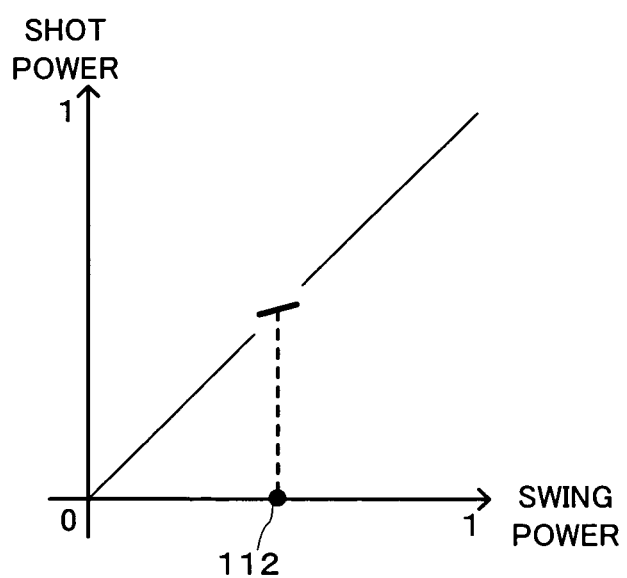
FIG. 17 is a diagram illustrating an example where shot powers in the conversion range are represented by a first-order function.

Although a shot power is uniformly set for best swing power values within the conversion range, the example embodiment presented herein is not limited to this. For example, values represented by a first-order function which passes through the original best swing power may be defined as shot power values within the conversion range as illustrated in FIG. 17. In this case, the first-order function preferably causes a parameter change amount to be smaller within the conversion range than outside the conversion range.

The width of the conversion range (the conversion width 343) may be changed for each club type in addition to the above-described difficulty setting. In addition to this (club type), for example, a process of broadening the conversion range width when a predetermined item is used in a game so as to give an advantage to a player, may be performed. Thereby, it is possible to make the game more exciting.

Regarding the swing power outside the conversion range, although values obtained by subjecting both ends outside the conversion range to the Hermitian interpolation are used in the above-described embodiment, the interpolation method is not limited to this, and may be other curve interpolation methods, such as spline interpolation and the like. With any of these methods, it is made easier to input one which leads to a best result, depending on the contents of a game, of parameters obtained by a series of operations for moving a controller, thereby making it possible to reduce the game difficulty and make the game more exciting.

While the example embodiment presented herein has been described in detail, the foregoing description is in all aspects illustrative and not restrictive. It is understood that numerous other modifications and variations can be devised without departing from the scope of the example embodiment.

What is claimed is:

1. A recording medium recording a game program which causes a computer in a game apparatus to execute a game process based on an input value varying, depending on a motion of an input device itself, the program causing the computer to execute:
   reference value setting for setting a predetermined value within an input value range within which the input value can fall, as a reference value;
   specific range setting for setting a portion of the input value range including the reference value, as a specific range;
   input value obtaining for obtaining the input value varying, depending on the motion of the input device itself;
   conversion for, when different input values obtained by the input value obtaining fall within the specific range, converting the different input values into the same game parameter value which is the same as or close to the reference value; and
   performing the game process using the game parameter value.

2. The recording medium according to claim 1, wherein, in the conversion, when the input value obtained in the input value obtaining does not fall within the specific range, the input value is converted into a game parameter value which is the same as or in a vicinity of the input value.

3. The recording medium according to claim 1, wherein, in the conversion, when the input value obtained in the input value obtaining is present at a boundary of the specific range, the game parameter value includes continuous values inside and outside of the specific range.

4. The recording medium according to claim 1, wherein, in the specific range setting, a predetermined range around the reference value as a center is set as the specific range.

5. The recording medium according to claim 1, wherein, in the conversion, the conversion is performed so as to obtain a continuous relationship between each input value within the input range and the corresponding game parameter value obtained by converting the input value.

6. The recording medium according to claim 2, wherein, in the conversion, the conversion is performed so as to obtain a continuous relationship between each input value outside the input range and the corresponding game parameter value obtained by converting the input value.

7. The recording medium according to claim 2, wherein the conversion performed in the conversion with respect to each input value outside the input range is performed by interpolating the input values using predetermined curve interpolation.

8. The recording medium according to claim 1, wherein the reference value is a predetermined value so that a predetermined game process based on the game parameter value obtained by converting the input value provides a best result, depending on contents of a game.

9. The recording medium according to claim 8, wherein the reference value setting includes:

comparative value setting for setting an upper limit value of the input value range as a first comparative value and a lower limit value of the input value range as a second comparative value;

input intermediate value calculating for calculating an input intermediate value which is an intermediate value between the first comparative value and the second comparative value;

a simulation for performing a predetermined game process using game parameter values obtained by performing the predetermined conversion with respect to the first comparative value and the second comparative value, to calculate respective resultant values; and comparative value updating for comparing the resultant values calculated by the simulation, and updating, with the input intermediate value, one of the first comparative value and the second comparative value which is converted by the predetermined conversion into a game parameter value which has a larger difference from the predetermined value which provides a best result, depending on the contents of the game, wherein the input intermediate value calculating, the simulation, and the comparative value updating are repeatedly performed until a predetermined condition is satisfied, and in the reference value setting, the input intermediate value when the predetermined condition is satisfied is set as the reference value.

10. The recording medium according to claim 9, wherein the predetermined condition is either that the first comparative value is equal to the second comparative value, or that an input value is obtained by the input value obtaining.

11. The recording medium according to claim 8, wherein the reference value setting includes:

a simulation for performing a predetermined game process with respect to game parameter values obtained by performing the predetermined conversion with respect to values within the input value range at predetermined intervals, to calculate resultant values, wherein a value within the input value range which is converted by the predetermined conversion into a game parameter value which provides a best result, depending on the contents of the game, of the resultant values calculated by the simulation step, is calculated, is set as the reference value.

12. The recording medium according to claim 8, wherein the predetermined game process is a process of driving a movable object in a virtual game space.

13. The recording medium according to claim 12, wherein the predetermined value which provides the best result, depending on the contents of the game, is a value for indicating a position to which the movable object is driven or a trajectory in which the movable object is driven.

14. A game apparatus for performing a game process based on an input value varying, depending on a motion of an input device itself, comprising:

reference value setting programmed logic circuitry for setting a predetermined value within an input value range within which the input value can fall, as a reference value;

specific range setting programmed logic circuitry for setting a portion of the input value range including the reference value, as a specific range;

input value obtaining programmed logic circuitry for obtaining the input value varying, depending on the motion of the input device itself;

conversion programmed logic circuitry for, when the input value obtained by the input value obtaining programmed logic circuitry falls within the specific range, converting the input value into a game parameter value which is the same as or close to the reference value; and process programmed logic circuitry for performing the game process using the game parameter value.

15. The game apparatus according to claim 14, wherein, in the conversion programmed logic circuitry, when the input value obtained in the input value obtaining programmed logic circuitry does not fall within the specific range, the input value is converted into a game parameter value which is the same as or in a vicinity of the input value.

16. The game apparatus according to claim 14, wherein, in the conversion programmed logic circuitry, when the input value obtained in the input value obtaining programmed logic circuitry is present at a boundary of the specific range, the game parameter value includes continuous values inside and outside of the specific range.

17. The game apparatus according to claim 14, wherein, in the specific range setting programmed logic circuitry, a predetermined range around the reference value as a center is set as the specific range.

18. The game apparatus according to claim 14, wherein, in the conversion programmed logic circuitry, the conversion is performed so as to obtain a continuous relationship between each input value within the input range and the corresponding game parameter value obtained by converting the input value.

19. The game apparatus according to claim 15, wherein, in the conversion programmed logic circuitry, the conversion is performed so as to obtain a continuous relationship between each input value outside the input range and the corresponding game parameter value obtained by converting the input value.

20. The game apparatus according to claim 15, wherein the conversion performed in the conversion programmed logic circuitry with respect to each input value outside the input range is performed by interpolating the input values using predetermined curve interpolation.

21. The recording medium according to claim 12, wherein said specific range corresponds to a detected swing power in said predetermined game process, and said game parameter value obtained by converting the input value corresponds a shot power in said predetermined game process.

* * * * *